United States Patent
Miller

(10) Patent No.: US 11,223,489 B1
(45) Date of Patent: Jan. 11, 2022

(54) ADVANCED SECURITY CONTROL IMPLEMENTATION OF PROXIED CRYPTOGRAPHIC KEYS

(71) Applicant: Garantir LLC, San Diego, CA (US)

(72) Inventor: Kieran Miller, San Diego, CA (US)

(73) Assignee: Garantir LLC, San Diego, CA (US)

( * ) Notice: Subject to any disclaimer, the term of this patent is extended or adjusted under 35 U.S.C. 154(b) by 0 days.

(21) Appl. No.: 17/229,426

(22) Filed: Apr. 13, 2021

Related U.S. Application Data

(60) Provisional application No. 63/152,831, filed on Feb. 23, 2021.

(51) Int. Cl.
  *H04L 9/32* (2006.01)
  *G06N 20/00* (2019.01)
  *H04L 9/08* (2006.01)

(52) U.S. Cl.
  CPC .......... *H04L 9/3271* (2013.01); *G06N 20/00* (2019.01); *H04L 9/0819* (2013.01); *H04L 9/3247* (2013.01)

(58) Field of Classification Search
  CPC ... H04L 9/3271; H04L 9/0819; H04L 9/3247; G06N 20/00
  See application file for complete search history.

(56) References Cited

U.S. PATENT DOCUMENTS

| | | | |
|---|---|---|---|
| 7,711,120 B2 | 5/2010 | Kimmel et al. | |
| 7,958,347 B1 * | 6/2011 | Ferguson | H04L 9/321 713/155 |
| 8,613,070 B1 * | 12/2013 | Borzycki | H04L 67/10 726/8 |
| 8,873,747 B2 | 10/2014 | Polzin et al. | |
| 9,020,149 B1 | 4/2015 | Golwalkar | |
| 9,154,488 B2 * | 10/2015 | Innes | H04L 63/08 |
| 9,223,950 B2 * | 12/2015 | Li | H04L 63/083 |
| 9,584,325 B1 | 2/2017 | Brandwine et al. | |
| 9,887,975 B1 | 2/2018 | Gifford | |
| 10,164,955 B1 | 12/2018 | Halcrow et al. | |
| 10,491,576 B1 | 11/2019 | Pfannenschmidt et al. | |
| 10,872,152 B1 | 12/2020 | Martel | |

(Continued)

OTHER PUBLICATIONS

Bortolozzo et al., "Attacking and Fixing PKCS#11 Security Tokens", ACM, Year 2010, 10 pages.

*Primary Examiner* — Christopher A Revak
(74) *Attorney, Agent, or Firm* — Hickman Becker Bingham Ledesma LLP

(57) ABSTRACT

Techniques for transparently adding one or more security controls to a challenge-response-based protocol are provided. In one technique, a client device sends a request for a resource to a resource server. The client device receives a challenge as part of a challenge-response handshake and forwards, to a proxy server, the challenge as part of a cryptographic request that includes a key identifier and certain data. In response, the proxy server initiates one or more security controls and sends the key identifier and the certain data to a cryptographic device that generates output based on the certain data. The proxy server receives the output from the cryptographic device. The proxy server determines whether at least one of the security controls resulted in a success. The proxy server sends the output to the client device only in response to determining that at least one of the security controls resulted in a success.

20 Claims, 4 Drawing Sheets

(56) References Cited

U.S. PATENT DOCUMENTS

| | | |
|---|---|---|
| 2008/0019527 A1 | 1/2008 | Youn et al. |
| 2010/0093273 A1 | 4/2010 | Hohl |
| 2014/0019753 A1 | 1/2014 | Lowry et al. |
| 2016/0156621 A1 | 6/2016 | Thom et al. |
| 2016/0380985 A1 | 12/2016 | Chhabra et al. |
| 2017/0006018 A1 | 1/2017 | Campagna et al. |
| 2017/0024584 A1 | 1/2017 | Chhabra et al. |
| 2017/0228559 A1 | 8/2017 | Jackson |
| 2017/0357830 A1 | 12/2017 | Benson et al. |
| 2018/0167203 A1 | 6/2018 | Belenko |
| 2018/0205711 A1 | 7/2018 | Kumar et al. |
| 2018/0367311 A1 | 12/2018 | Stahlberg et al. |
| 2019/0229902 A1 | 7/2019 | Zheng et al. |
| 2019/0394024 A1 | 12/2019 | Vepa et al. |
| 2020/0076585 A1 | 3/2020 | Sheppard et al. |
| 2020/0136822 A1 | 4/2020 | Villapakkam et al. |
| 2020/0145199 A1 | 5/2020 | Kounavis et al. |
| 2020/0244445 A1 | 7/2020 | Ponnusamy et al. |
| 2020/0244454 A1 | 7/2020 | Gupta et al. |
| 2020/0304299 A1 | 9/2020 | Medvinsky et al. |
| 2021/0036851 A1 | 2/2021 | Villapakkam et al. |
| 2021/0056547 A1 | 2/2021 | Monica et al. |
| 2021/0111886 A1 | 4/2021 | Leiserson |
| 2021/0124823 A1 | 4/2021 | Lidzborski et al. |
| 2021/0173916 A1 | 6/2021 | Ortiz |
| 2021/0203491 A1 | 7/2021 | Wei et al. |
| 2021/0218555 A1 | 7/2021 | Mastenbrook et al. |
| 2021/0320789 A1 | 10/2021 | Medvinsky et al. |

\* cited by examiner

ADVANCED SECURITY CONTROL IMPLEMENTATION OF PROXIED CRYPTOGRAPHIC KEYS

BENEFIT CLAIM

This application claims the benefit of Provisional Application No. 63/152,831, filed Feb. 23, 2021, the entire contents of which is hereby incorporated by reference as if fully set forth herein, under 35 U.S.C. § 119(e).

TECHNICAL FIELD

The present disclosure relates generally to cryptographic keys and, more specifically, to enhancing authentication by enforcing security controls on a remote server that proxies cryptographic keys.

BACKGROUND

Authentication is the act of proving an assertion, such as the identity of a computer system user, or the process of verifying that identity. In computer system cryptography, authentication may be performed using one or more of a number of techniques, such as decryption, MAC (message authentication code), and digital signatures, each of which involves cryptographic keys.

For example, a digital signature is a mathematical scheme for verifying the authenticity of digital data. A valid digital signature, where the prerequisites are satisfied, provides authentication regarding the sender of a piece of data and ensures integrity regarding the contents of the data. In other words, a digital signature gives a recipient of the data strong reason to believe that the data was created by a known sender (authentication) and that the data was not altered since digitally signed (integrity).

Digital signatures may be part of one or more cryptographic protocol suites and may be used for software distribution, financial transactions, contract management, and in other cases where it is important to detect forgery or tampering.

Digital signatures employ asymmetric cryptography. In many instances, digital signatures provide a layer of validation and security to data sent through a non-secure channel. Digital signatures are analogous to traditional handwritten signatures in many respects, but properly implemented digital signatures are more difficult to forge than the handwritten type. Digital signature schemes are cryptographically based and must be implemented properly to be effective.

A digital signature scheme typically involves three algorithms:
  (1) a key generation algorithm that selects a private (cryptographic) key (e.g., at random) from a set of possible private keys. The algorithm outputs the private key and a corresponding public key;
  (2) a signing algorithm that, given a message and a private key, produces a signature; and
  (3) a signature verifying algorithm that, given the message, public key, and signature, either accepts or rejects the message's claim to authenticity.

Two main properties are required for any digital signature scheme. First, the authenticity of a signature generated from a message and a private key can be verified by using the corresponding public key. Secondly, it should be computationally infeasible to generate a valid signature for a party without knowing that party's private key. A digital signature is an authentication mechanism that enables the creator of the message to attach a code that acts as a signature. The Digital Signature Algorithm (DSA), developed by the National Institute of Standards and Technology, is one of many examples of a signing algorithm.

Current approaches for maintaining cryptographic keys are deficient. Such approaches involve storing cryptographic keys on client devices. In enterprises with many client devices, managing such storage is difficult and security is poor. For example, a hacker that gains access to one of the client devices has access to all the cryptographic keys stored on that client device and, as a result, is able to authenticate itself to a resource server, thus impersonating the client device. Therefore, the hacker can access resources that are made available through the resource server and that are accessible to the client device as a result of its cryptographic keys. Also, if the same compromised cryptographic keys are stored on all client devices, then compromising only a single client device is sufficient for the hacker to potentially obtain access to all privileged resources that require those cryptographic keys.

In some approaches, a resource server (that grants or denies access to a privileged resource that a client device requests) implements security measures in addition to authentication that involves cryptographic keys. However, resource servers are typically configured to simply authenticate clients by verifying digital signatures before allowing access to requested resources. In order to implement additional security measures, a resource server must be updated to be so configured, which has multiple downsides. First, the more resource servers there are, the more software updates that need to be made (which updates are tedious and time-consuming) and the more likely errors are to occur, such as a misconfiguration, outages caused by taking the system down to perform the update, and security issues resulting from forgetting or delaying the update. Second, as additional security measures are added to a resource server, the likelihood that errors will occur also increases with respect to existing authentication protocols, thus jeopardizing the functionality of existing clients that communicate with that resource server. Third, in the case where an owner of resource servers maintains multiple classes of resource servers, multiple different types of updates need to be made, which also increases the likelihood of errors occurring. In some situations, an organization does not own the resource server, but rather a third-party (e.g., cloud provider) owns the resource server. The organization may want to add more strict security controls, but the owner (or provider) does not offer such capabilities.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, some structures and devices are shown in block diagram form in order to avoid unnecessarily obscuring the present invention.

General Overview

A system and method for enhancing security controls on remote cryptographic keys are provided. In one technique, a client device transmits a request for a resource to a resource server that grants and denies access to a resource. In response, the client device receives, from the resource server, a response that includes challenge data that prompts the client device to provide a digital signature authenticating the client device to the resource server. In response to that response, the client device sends, to a proxy server, an authentication request that includes the challenge data. In response to receiving the authentication request, the proxy server initiates one or more security controls, such as multi-factor authentication, device authentication, and IP whitelisting. The proxy server sends the challenge data to a cryptographic device that generates a digital signature based on the challenge data and a cryptographic key, which is remote relative to the client device. The proxy server receives the digital signature from the cryptographic device and sends the digital signature to the client device if a result of the one or more security controls is a pass. Finally, the client device sends the digital signature to the resource server.

Embodiments improve approaches for authenticating client devices by moving the authentication process from client devices to a proxy server, which results in increased security from having the proxy server manage access to cryptographic keys rather than requiring client devices to store their own cryptographic keys. Also, embodiments allow for the adoption of additional security controls in the authentication process without having to change the resource server.

System Overview

Figure 1:
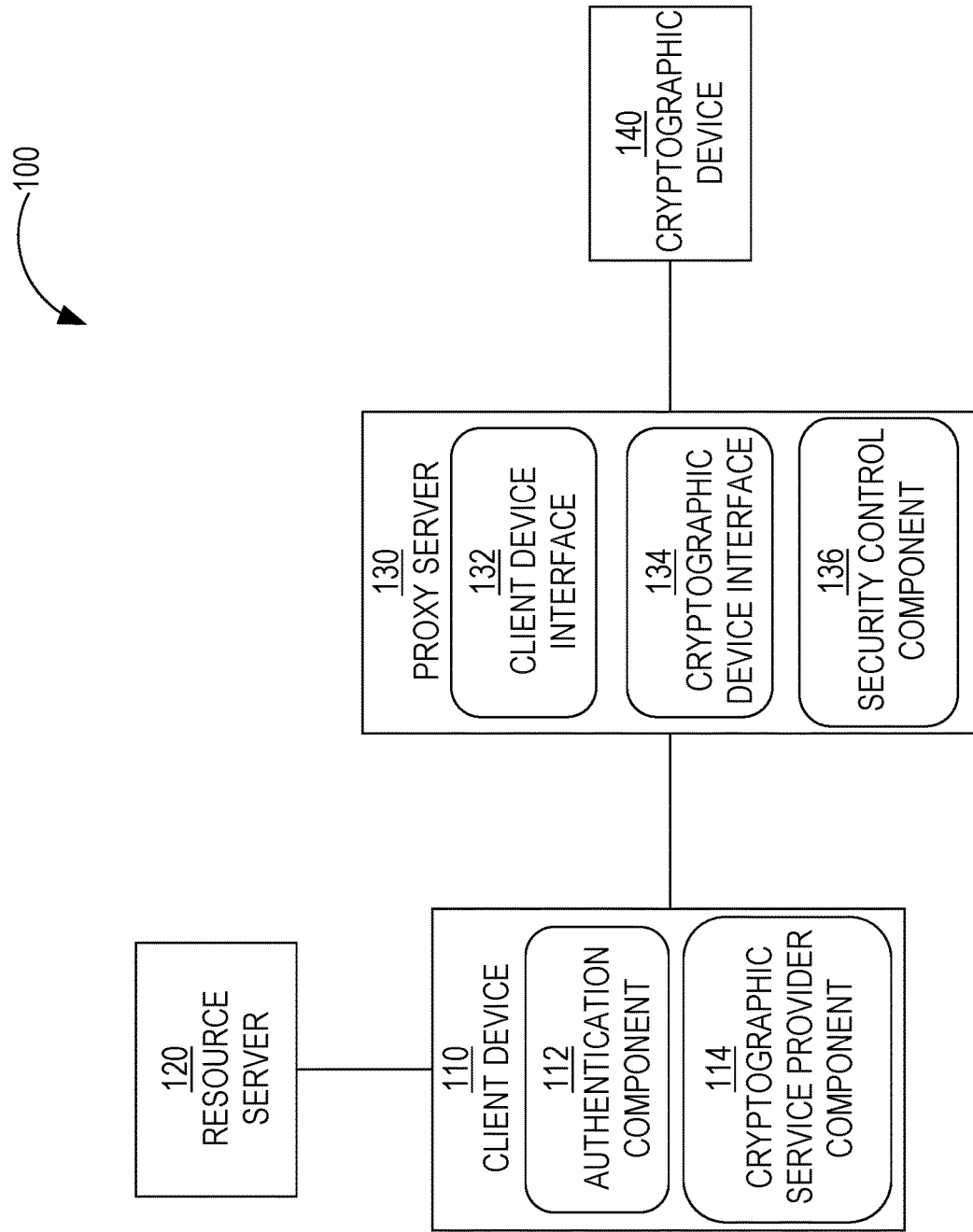
FIG. 1 is a block diagram that depicts an example system for enhancing authentication by enforcing security controls on remote cryptographic keys, in an embodiment.

FIG. 1 is a block diagram that depicts an example system for enhancing authentication by enforcing security controls on remote cryptographic keys, in an embodiment. System 100 includes a client device 110, a resource server 120, a proxy server 130, and a cryptographic device 140. These elements or components of system 100 may reside in different networks or in the same network. For example, system 100 is implemented in the same physical site (or premises) owned by a particular entity (e.g., a company) that requests digital signatures. As another example, system 100 is implemented in a virtual private cloud (VPC) that is part of a third-party cloud service, but that is dedicated to a single entity (e.g., a company) that requests digital signatures. Alternatively, some elements of system 100 (e.g., client device 110 and proxy server 130) may be implemented on a company's premises and other elements of system 100 (e.g., resource server 120) may be implemented in a VPC that is dedicated to supporting the company.

Server 120 is "privileged" in the sense that server 120 manages access to "privileged" resources, which are resources that require a requesting client to be authenticated before access to those resources are granted.

Client device 110 includes an authentication component 112 that executes on client device 110 and is configured to communicate with resource server 120. Authentication component 112 includes a cryptographic service provider (CSP) component 114 that is configured to communicate with proxy server 130, such as routing authentication challenges to proxy server 130 in response to authentication challenges from resource server 120 and routing decryption requests to proxy server 130.

Client device 110 is communicatively coupled to resource server 120 and proxy server 130 over one or more computer networks (not depicted). Examples of such a network include a local area network (LAN), a wide area network (WAN), and the Internet. Although only one client device 110 is depicted, system 100 may include multiple client devices that are communicatively coupled to servers 120 and 130. In the case of multiple client devices, a load balancer may sit between multiple proxy servers (not depicted) and the multiple client devices. The load balancer balances cryptographic requests (from the multiple client devices) among the multiple proxy servers, such that each proxy server has approximately the same load (e.g., as measured by the number of cryptographic requests each proxy server is currently processing).

A cryptographic request may be a request for a digital signature for authentication purposes, a request to decrypt certain data, a request for authenticating a MAC (message authentication code), or a request for Diffie-Hellman (D-H) request, which is a request to exchange cryptographic keys over a public channel, such as the Internet.

A cryptographic or authentication request from client device 110 to proxy server 130 includes challenge data, such as a hash. A cryptographic request may also include a data identifier that identifies a data item upon which the hash is based. In the context of signing code, the data item is a set of one or more source code files and the data identifier is a source revision number. In the context of signing an electronic document, the data item is the electronic document and the data identifier is a document identifier, such as a URL or a path name that uniquely identifies a logical storage location of the document.

If cryptographic device 140 stores multiple keys, then the cryptographic request may also include a key ID that uniquely identifies one of the keys. The cryptographic request may also include data that identifies which hashing algorithm was used to produce the hash, as well as parameters of the hashing and signature algorithms. Such parameters are used for one or more reasons. For example, in certain cases (e.g., RSA signing) the hash is prepended with an algorithm identifier before signing. This prepending may be performed server-side, in which case the hash algorithm used needs to be known. As another example, in order to validate a hash independently, the hash algorithm needs to be known. As another example, the identity of the hashing algorithm may be used for future auditing purposes.

In an embodiment, authentication component 112 and CSP component 114 are separate from application code that executes on client device 110 and that includes separate business logic pertaining to task(s) client device 110 is intended to perform. An example of such application code is a build server that takes part in the build process to create, from source code, one or more executables of a software program. Another example of such application code is a word processing application that allows for the digital signing of electronic documents, where a master copy of an electronic document is stored in a central document repository. An example of client device 110 is a computing device operated by a single person who directly requests a digital signature for a piece of data, decryption of a piece of data, or a D-H exchange to occur.

Resource Server

Resource server 120 manages access to resources that are stored by or "behind" resource server 120. Resource server 120 grants resource requests to authenticated and authorized users. Thus, resource server 120 responds to requests for those resources after requestors are authenticated. Resource server 120 initiates a challenge-response handshake in response to receiving, from client device 110 and other client devices, a request for a resource. The challenge is provided by resource server 120 to client device 110 and client device 110 needs to provide the correct response in order to be authenticated to resource server 120.

Resource server 120 may implement one or more challenge-response-based protocols. In some such protocols, the challenge is explicit, such as a hash value that client device 110 needs to decrypt with an appropriate cryptographic key. In another such protocol, the challenge is implicit, such as through TOTP (time-based one-time password). According to this algorithm, the authenticatee and authenticator pre-establish both HOTP (HMAC-based one-time password) parameters and the following TOTP parameters: (1) $T_0$, the Unix time from which to start counting time steps (default is 0); and (2) Tx, an interval which will be used to calculate the value of the counter $C_T$ (default is 30 seconds). Both the authenticator and the authenticatee compute the TOTP value, then the authenticator checks if the TOTP value supplied by the authenticatee matches the locally generated TOTP value.

Resource server 120 may be communicatively connected to one or more databases, one or more file systems, and/or one or more cloud services. Also, resource server 120 may host one or more online services and/or is connected to one or more computing devices that hosts one or more online services. Examples of privileged resources include data, applications, and online services. An example of a resource server is a privileged server, which serves only privileged users, who are typically considered to be system administrators.

Resource server 120 may be hosted "on premise" of an enterprise that owns the data protected by the resource server 120. That is, one or more instances of resource server 120 execute on one or more computing devices that are also owned by the enterprise. Alternatively, resource server 120 may be hosted by cloud hosting service, which owns the computing devices that execute one or more instances of resource server 120.

Client device 110 generates and transmits, to proxy server 130, a cryptographic request that may include data, such as challenge data from resource server 120, and one or more parameters. The cryptographic request includes a key name or identifier that identifies a cryptographic key stored at cryptographic device 140. Client device 110 uses one or more techniques to communicate with resource server 120. One example technique is using a RESTful API, which is an application programming interface that uses HTTP requests to GET, PUT, POST, and DELETE data. A RESTful API is based on representational state transfer (REST) technology, which is an architectural style and approach to communications used in web services development.

Proxy Server

Proxy server 130 is responsible for providing cryptographic services (e.g., providing digital signatures) to client device 110 (and, potentially, other clients, not depicted) upon receiving a cryptographic request from client device 110. Proxy server 130 is implemented on one or more computing devices that are separate from client device 110. As noted above, system 100 may include multiple instances of proxy server 130 that are able to process cryptographic requests from one or more client devices. The multiple instances may be implemented on one or more computing devices.

Proxy server 130 includes a client device interface 132 and a cryptographic device interface 134. Client device interface 132 sends data to and receives data from client device 110 (and other client devices not depicted) while cryptographic device interface 134 sends data to and receives data from cryptographic device 140. Each of interfaces 132-134 is implemented in software, hardware, or any combination of software and hardware.

In response to receiving an authentication request, proxy server 130 sends challenge data to cryptographic device 140, which selects a private key, generates a digital signature based on the private key and the challenge data, and returns the digital signature to proxy server 130. Proxy server 130 sits in between cryptographic device 140 and client device 110, thus, hiding the complexity of client device 110 having to interact directly with cryptographic device 140. In a related example, decryption is used as part of an authentication protocol. Here, resource server 120 encrypts random data with a user's (or client device's) public key and asks the user/client device to decrypt the encrypted random data with the private key of the user/client device. If the user/client device successfully decrypts the data, then the user/client device is authenticated. At the point of decryption, the additional security controls would be triggered.

Similarly, in response to receiving a decryption request, proxy server 130 sends encrypted data to cryptographic device 140, which selects a private key, decrypts the encrypted data based on the private key, and returns the decrypted data to proxy server 130.

Cryptographic Device

Cryptographic device 140 is a device that stores one or more private cryptographic keys and that is accessible to proxy server 130. Examples of cryptographic device 140 include a key manager, a hardware security module (HSM), and a software-based keystore. Cryptographic device 140 may be remote or local relative to proxy server 130, which does not have direct access to the keys stored by cryptographic device 140, making system 100 secure.

If cryptographic device 140 stores multiple private keys, then each key may be associated with a different key identifier (ID). Thus, a signature request from server 120 may include a key ID, which may have originated in the corresponding signature request that server 120 received from client 110.

Although system 100 depicts only one cryptographic device 140, system 100 may include multiple cryptographic devices that store keys for generating digital signatures for client device 110 and, optionally, other client devices (not depicted). In other words, client device 110 may, at different times, request cryptographic services involving different keys that are stored in different cryptographic devices.

System 100 may include other elements that are not depicted, such as (1) a notification server that generates and sends notifications in response to (i) cryptographic request failures and/or successes, (ii) cryptographic requests from certain client devices or users, and/or (iii) cryptographic requests for certain keys, (2) one or more administrative servers that allow administrators to perform certain duties (e.g., user management, key management), and (3) a message broker that allows proxy server 130, any administrative servers, and any notification server to communicate.

Additional Security Controls

As described herein, in an embodiment, proxy server 130 (and, optionally, one or more other elements of system 100 interacting with proxy server 130) performs (or at least initiates) one or more additional security controls in response to a cryptographic request from client device 110. In this way, resource server 120 does not have to be updated to support these additional security controls. In this embodiment where proxy server 130 initiates one or more security controls, proxy server 130 includes a security control component 136 that implements one or more security controls and/or communicates with other components or devices that implement one or more security controls.

A result of initiating a security control may be a pass or fail, a success or failure. (As described in more detail below, a result of initiating a security control may be a non-binary value that is in a range, such as between 0 and 1, or that is one of three or more possible values representing classes of a result.) If a component that is separate from proxy server 130 implements the security control, then the component sends proxy server 130 the result in an electronic message.

If client device 110 or the user operating client device 110 fails or does not pass an additional security control, then proxy server 130 drops the cryptographic request or does not return an intended response to the cryptographic request if such a response was generated. For example, in response to receiving a cryptographic request, proxy server 130 initiates one or more additional security controls at or near the same time that proxy server 130 sends challenge data to cryptographic device 140 for signing (or sends encrypted data to cryptographic device for decrypting). Thus, in this scenario, the time required for the one or more additional security controls to return with a response or result does not delay the processing of the cryptographic request.

In an embodiment, proxy server 130 initiates multiple security controls in sequence. For example, proxy server 130 initiates security control A, initiates security control B only if security control A passes, and initiates security control C only if second control B passes. Additionally or alternatively, proxy server 130 initiates multiple security controls in parallel. For example, proxy server 130 initiates security controls A, B, and C at or around the same time without waiting for one of the security controls to complete or finish.

In an embodiment where multiple security controls are initiated by a cryptographic request, proxy server 130 may proceed with processing the cryptographic request if any of the security controls result in a pass or success, indicating that the cryptographic request may be responded to positively.

In an embodiment where multiple security controls are initiated by a cryptographic request, if a client device or user passes a particular security control, then the client device or user does not have to pass any more security controls. However, if the client device or user does not pass the particular security control, then the client device or user must pass one or more of the other security controls.

The number and types of additional security controls that proxy server 130 initiates may vary from one implementation to another and from one client device or user to another client device or user. For example, some users may require one set of additional security controls while other users may require another set of additional security controls. As another example, some classes of client devices may require one set of additional security controls while other classes of client devices may not require any additional security controls. As another example, different types of keys may be assigned different security controls. As a specific example, production keys may have strict security controls while non-production keys (e.g., "test" or "sandbox" keys) may have more relaxed (if any) security controls.

Security control component 136 determines whether one or more of the initiated security controls pass or return successful. Based on the implementation, security control component 136 may notify client device interface 132 or cryptographic device interface 134 upon the determination. For example, if security control component 136 determines that all security controls (that were initiated in response to a cryptographic request) return a success, then security control component 136 notifies cryptographic device interface 134 to forward the cryptographic request to cryptographic device 140. As another example, if security control component 136 determines that all security controls (that were initiated in response to a cryptographic request) return a success and if cryptographic device interface 134 already sent the cryptographic request to cryptographic device 140, then security control component 136 notifies client device interface 132 to send a response that was already generated by cryptographic device 140. As another example, if security control component 136 determines that at least one security control (that was initiated in response to a cryptographic request) returns a failure, then security control component 136 notifies client device interface 132 to send a response to client device 110 informing client device 110 of the failure.

Examples of security controls that proxy server 130 initiates (e.g., through security control component 136) in response to cryptographic requests include multi-factor authentication (MFA), device authentication, approval workflow, IP address whitelisting, geo-location check, key check, and a rules engine that scores a cryptographic request, which score is used to determine whether to process the cryptographic request. Some of these security controls may involve additional communication with client device 110 in order to complete a security operation, such as MFA, device authentication, and, optionally, approval workflow.

Security Control: Multi-Factor Authentication

MFA is a s an electronic authentication method in which a user is granted access to a resource (or, in this case, to a valid response to a cryptographic request) only after successfully presenting two or more pieces of evidence (or factors) to an authentication mechanism. Examples of types of such factors include knowledge (something only the user knows), possession (something only the user has), and inherence (something only the user is). Simple authentication requires only one such piece of evidence (factor), typically a password. For additional security, more than one factor is required. For example, an MFA mechanism may require a password and a code that the MFA mechanism sends (e.g., via text) to a computing device of the user.

The use of multiple authentication factors to prove one's identity is based on the premise that an unauthorized actor is unlikely to be able to supply the factors required for access. If, in an authentication attempt, at least one of the components is missing or supplied incorrectly, then the user's identity is not established with sufficient certainty and access to a resource being protected by MFA remains blocked. The authentication factors of a MFA scheme may include:

Something physical that the user has, such as a security token (USB stick), a bank card, a key.
Something that the user knows: certain knowledge only known to the user, such as a password or PIN.
Something the user is, or a physical characteristic of the user (biometrics), such as a fingerprint, eye iris, voice, typing speed, or pattern in key press intervals.

Proxy server 130 may implement an MFA mechanism or may invoke another component that implements the MFA mechanism. The other component may be implemented on the same computing device(s) upon which proxy server 130 is implemented. Whichever component implements the MFA mechanism, that component ensures that multiple factors associated with a user (that is operating client device 110) are received and verified as being associated with the user. The MFA mechanism may require a user password, a one-time password (OTP) (which is a code generated or received by an authenticator, such as a security token or smartphone) that only the user possesses, and/or a randomly generated and constantly refreshing code which the user can use, rather than sending a text message (e.g., via SMS), an email message, or using another method.

Security Control: Device Authentication

Device authentication is a process for authenticating client device 110 and other client devices that send cryptographic requests to proxy server 130. Proxy server 130 may implement device authentication or another component that proxy server 130 invokes or calls may implement device authentication. Device authentication involves identifying a client device that has a secure enclave, which has one or more non-extractable keys. An example of a secure enclave is a Trusted Platform Module (TPM), which is a dedicated microcontroller designed to secure hardware through integrated cryptographic keys. Proxy server 130 (or another component that proxy server 130 invokes or calls and that implements device authentication) interacts with the secure enclave to securely identify the client device.

For example, a user might have a work computer and a personal computer, both of which might have a secure enclave. However, the device authenticator might not recognize the personal computer and will, therefore, reject any cryptographic requests from the personal computer. To see why, the keys in the secure enclave for the various computers will be different. The public keys are registered for each computer and a challenge-response handshake is used to validate that the computer has the corresponding private key. The work computer would have PubKeyA registered, which would require PrivKeyA to complete the handshake. The home computer would not have PrivKeyA and therefore could not pretend to be the work computer. Furthermore, unless the user registered their home computer's public key (i.e., PubKeyB), the home computer would just be unknown.

It is possible, however, to register PubKeyB as well, but then the proxy server would be able to distinguish between the two computers.

Security Control: Approval Workflow

Approval workflow is a type of security control that involves transmitting one or more messages to one or more individuals who must provide certain responses in order for the cryptographic request to be processed fully. Examples of messages include a text message, an email message, a push notification, and an in-app notification.

A message may include data that identifies client device 110, a user of client device 110, a privileged resource that the client device 110 requested from resource server 120, a geographic location of client device 110, a type of cryptographic request (e.g., encryption, decryption, D-H exchange). An example of data that identifies a type of cryptographic request is a type indicator. A message may also include a prompt that invites the individual to approve the cryptographic request and, optionally, to disapprove the cryptographic request. An approval may be the individual selecting a hyperlink or a button in the body of the message or selecting a reply button associated with the message and then selecting a send button. As additional examples, an approval may involve selecting the message itself or providing a fingerprint to client device 110 by selecting a button that detects fingerprints.

If multiple messages are transmitted, then approval may be defined as receiving approval from all individuals to which a message was sent. Alternatively, approval may be defined as receiving at least one approval, even though multiple other individuals did not provide approval.

Security Control: IP Address Whitelisting

IP address whitelisting is another example or type of security control. Either proxy server 130 maintains or has access to a whitelist of IP addresses or another component associated with proxy server 130 maintains or has access to such a whitelist. An system administrator of proxy server 130 may create the whitelist and may update the whitelist by adding new IP addresses and/or deleting IP addresses over time. Thus, while the IP address of client device 110 may be listed in the whitelist during one period of time, the IP address may be later removed from the whitelist, thus preventing the processing of cryptographic requests from the client device 110.

Security Control: Geo Test

A geo (short for "geographic") test is another type of security control that proxy server 130 might initiate. Proxy server 130 (or another component that proxy server 130 invokes) determines a geographic location of a client device and determines whether the geographic location is within an approved geographic location. An approved geographic location may change throughout the day and/or may be different for different users and/or different client devices. For example, a first approved geographic location is within a particular city between the hours of 9 AM and 5 PM and a second approved geographic location is within another city between the hours of 5 PM and 11 PM. As another example, for users 1-10, a first country is an approved geographic location while for users 11-20, a second country is an approved geographic location.

Geographic location of client device 110 may be determined based on geographic coordinates that client device 110 reports to proxy server 130 (or a separate geo-location component), either in the same cryptographic request or in a separate message from client device 110. Alternatively, a geographic location may be determined based a network identifier associated with the cryptographic request. For example, a client device's IP address may be used to determine the country, city, and/or ZIP code. Other methods include examination of Wi-Fi hotspots through which the client device is connected to the Internet and examination of a MAC address of the client device.

Security Control: Key Policy Check

A key policy check is another example of a security control that proxy server 130 might initiate. For example, an administrator of proxy server 130 may specify which keys are useable and which are not. Such specifications or designations may be made and updated from time to time. Also, such designations may be made in a key policy file that is accessible to proxy server 130 and that maps key identifiers to a specific state, such as a useability state. Alternatively, the key policy file may list only key identifiers that are not allowed to be used (e.g., a blacklist) or only key identifiers that are allowed to be used (e.g., a whitelist).

If a cryptographic request (e.g., a digital signature request) involves a key that is identified in a key policy file as being associated with a non-useable state, then proxy server 130 rejects the cryptographic request, or at least does not respond with the requested information.

Security Control: Rules Engine

A rules engine is another type of security control that proxy server 130 initiates in response to receiving a cryptographic request. The rules engine analyzes one or more attributes associated with the cryptographic request to determine whether to grant or process the cryptographic request. Example attributes of a cryptographic request include time of day of the request, date of the request, type of request, identity of the client device that transmitted the request, identity of a user of the client device, which key is being requested, the type of payload that is to be encrypted or decrypted (if any), the state of the cryptographic system (e.g., other malicious behavior has been detected in the last two hours so more strict security controls are activated), the frequency of recent requests, the state of external systems (e.g., external systems are on lockdown after a major network attack (e.g., SolarWinds attack), even if nothing has been detected yet in the local network).

A result of applying the rules of a rules engine may be a pass or a fail, or may be a non-binary value, such as a value between 0 and 100 or a value from 3 or more possible values, representing different classes of a result. If such a result is a non-binary value, then the rules engine may report this non-binary value to proxy server 130. Alternatively, the rules engine (or related component) may make a decision based on the non-binary value and generate a binary value (e.g., 1 or 0, indicating pass or fail) and report just the binary value to proxy server 130.

The rules engine may take into account other activities of the same user, the client device, and/or other users or client devices when making a decision on whether to process the cryptographic request. For example, if ten other client devices have requested the same key stored in cryptographic device 140 in the last hour, then the cryptographic request is denied.

The rules engine may comprise handwritten rules and/or a machine-learned model or classifier. An example of a handwritten rule is that a single client device may only send a maximum of over three cryptographic requests to proxy server 130 in a five hour period. If a fourth cryptographic request is sent from the client device in that five hour period, then proxy server 130 denies that request. As another example, attributes of a cryptographic request are input into a machine-learned model or classifier, which produces an output or score that is compared against a threshold, above or below which the cryptographic request is denied. The machine-learned model may take into account other features other than attributes of the cryptographic request, such as the number and/or types of cryptographic requests received from other client devices in the last 24 hours, the number of times a particular key was requested, and the number of previous denials of cryptographic requests from the client device or a user of the client device.

In order to leverage a rules engine that takes into account past events, proxy server 130 may generate a record for each cryptographic request that it receives. A record includes attributes of a cryptographic request referenced above. Proxy server 130 (or another component in system 100) may analyze the records to generate feature values that are input to the rules engine that may be invoked for each cryptographic request or for certain cryptographic requests, such as cryptographic requests that (a) originate from a particular user or a particular client device, (b) originate at a certain time of the day or day of the week, (c) request a key in a certain key set, and/or (d) are of a certain type.

Example Process for Client Authentication

Figure 2:
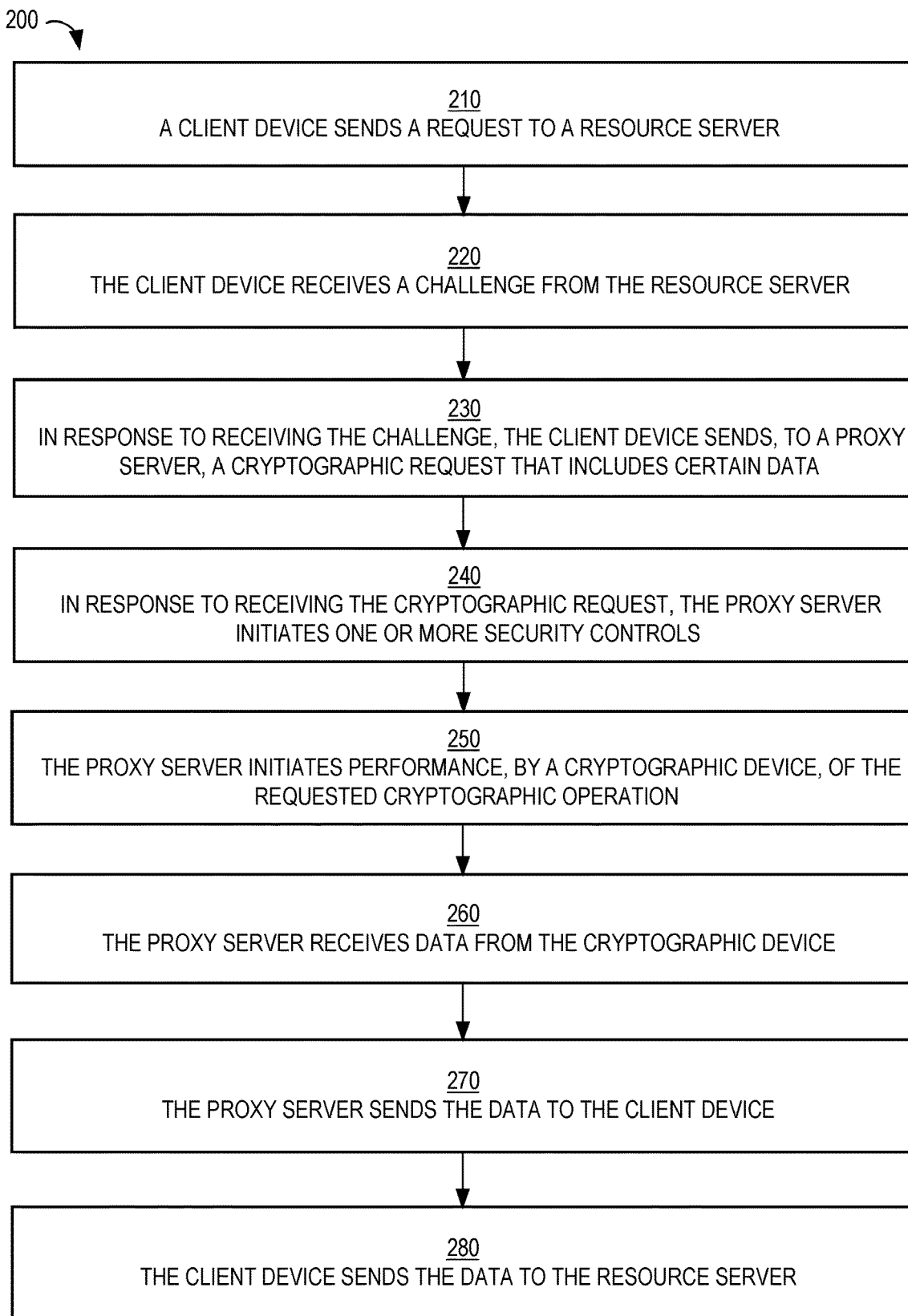
FIG. 2 is a flow diagram that depicts an example process for processing cryptographic requests, in an embodiment.

FIG. 2 is a flow diagram that depicts a process 200 for processing cryptographic requests, in an embodiment. Process is implemented by different entities in system 100.

At block 210, a client device sends a request to a resource server. If the request is for a resource, then the requested resource may be data or a service. The request is sent over a computer network, such as a LAN, WAN, or the Internet. The resource server may be on premise of the enterprise that owns or manages access to privileged resources. Alternatively, the resource server may be hosted by a cloud service provider that is different than the enterprise. Block 210 may be performed by authentication component 112.

At block 220, the client device receives, from the resource server, an authentication challenge, which may include challenge data, such as a hash value. The resource server may randomly generate the challenge data either before the resource server received the request or in response to receiving the request. Again, block 220 may be performed by authentication component 112.

At block 230, in response to receiving the authentication challenge, the client device sends, to a proxy server, an authentication/cryptographic request that includes the challenge data or other data if the challenge did not include challenge data. The authentication request is a type of cryptographic request that requests a digital signature that will be used by the client device to authenticate itself to the resource server. The request may include a type indicator that indicates a type of cryptographic operation, such as decryption, encryption, or D-H key exchange. Block 230 may be performed by CSP component 114.

At block 240, in response to receiving the authentication request, the proxy server initiates (or even executes) one or more security controls. For example, the proxy server may execute one security control and initiate another security control that another component executes. One or more of the initiated security protocols may involve electronic communication with the client device in order to complete a security operation associated with a security control. Block 240 may involve client device interface 132 informing security control component 136 about the authentication request.

At block 250, the proxy server initiates performance of the requested cryptographic operation. Examples of cryptographic operations include digital signature generation, data decryption, message authentication code generation, and D-H key exchange. For example, the proxy server sends the challenge data to a cryptographic device, which generates a digital signature based on the challenge data. In the case of data decryption for authentication, the cryptographic device decrypts the challenge data. Block 250 may involve the proxy server sending, to the cryptographic device, a type indicator that indicates the type of cryptographic operation requested.

Block 250 may be performed before the one or more security controls complete and, therefore, may be initiated at the same time as block 240 initiates. Block 250 may also involve sending one or more parameter values, such as a key identifier that the cryptographic device uses to identify the appropriate key stored therein. Block 250 may be performed by cryptographic device interface 134

At block 260, the proxy server receives data (e.g., a digital signature or decrypted data) from the cryptographic device. Thus, between block 250 and block 260, the cryptographic device selects a key (from among multiple keys) (e.g., identified in the data sent in block 250) and generates the digital signature by applying the key to the challenge data.

At block 270, the proxy server sends the received data (e.g., the digital signature or decrypted data) to the client device. Block 270 is only performed if the one or more security controls initiated by the proxy server complete successfully. For example, the proxy server delays sending the digital signature until at least one security control returns with a positive result. As another example, the proxy server delays sending the digital signature until all security controls that were initiated, in response to the authentication request, return a positive result.

The proxy server maintains connection data between the client device and the proxy server, where the connection data identifies the client device and is associated with the signature request sent to the cryptographic device. In this way, when the proxy server receives the digital signature from the cryptographic device, the proxy server associates the digital signature with the client device and, specifically, with the authentication request that triggered blocks 240-270.

At block 280, the client device sends the data (e.g., digital signature) to the resource server, which grants the request for the resource, assuming that the appropriate key was used to generate the data. Block 280 may be performed by authentication component 112.

Example Process for Content Decryption

Figure 3:
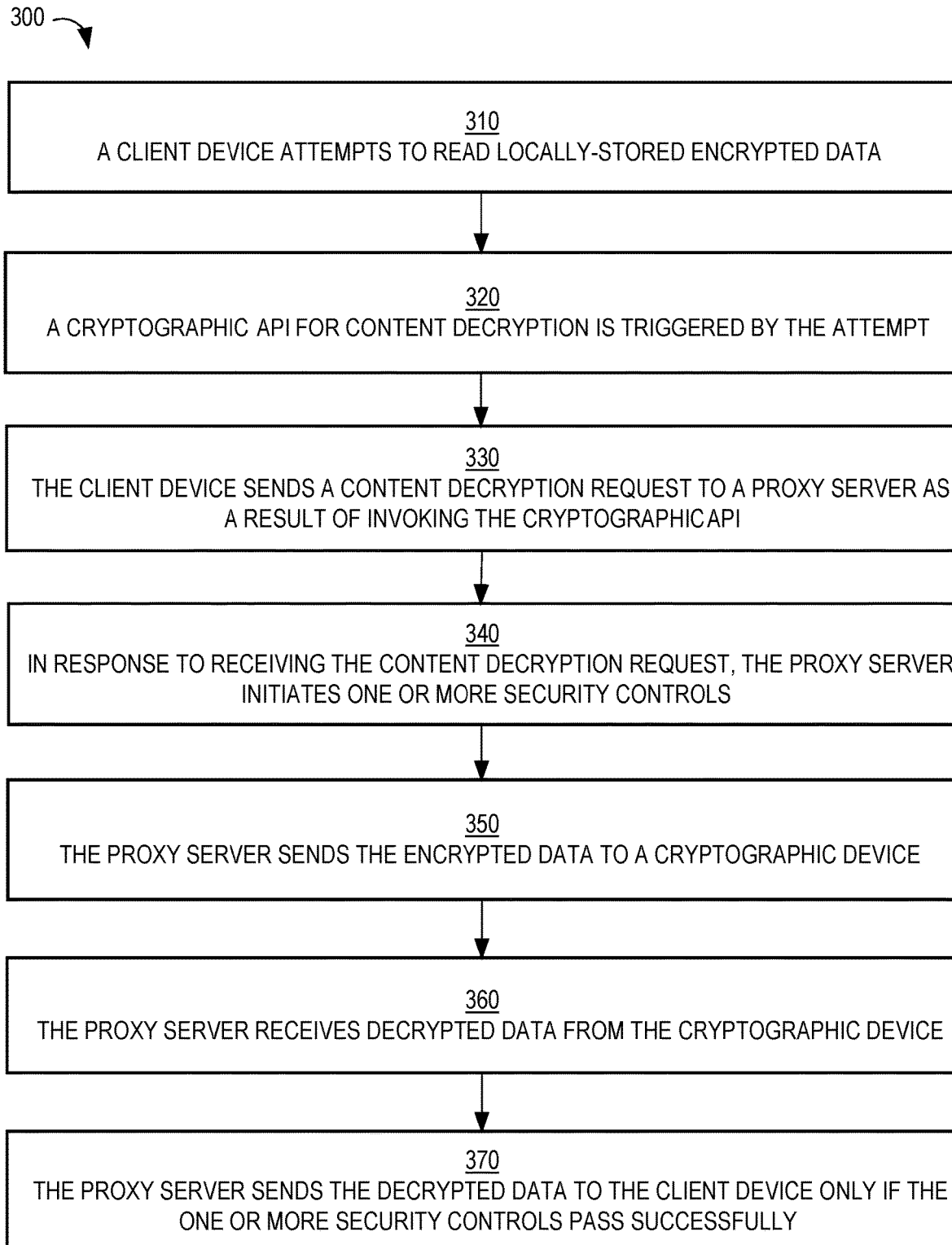
FIG. 3 is a flow diagram that depicts a process for processing content decryption requests, in an embodiment.

FIG. 3 is a flow diagram that depicts a process 300 for processing content decryption requests, in an embodiment. Process 300 is implemented by client device 110 and proxy server 130.

At block 310, a client device attempts to read locally stored encrypted data. Block 310 may be performed by an application executing on the client device, such as an email application attempting to opening an encrypted email or an encrypted attachment, a PDF (portable document format) reader application attempting to read an encrypted PDF file, or file system application attempting to open a file stored on the client device.

At block 320, a cryptographic API for content decryption is triggered by the attempt. For example, the client application (e.g., a PDF reader or email client) makes the cryptographic API call, which can be routed through a series of API calls that eventually results in calling a portion of the client device's operating system, which then calls CSP component 114, which is registered with the operating system.

At block 330, the client device sends a content decryption request to a proxy server as a result of invoking a cryptographic API call. Block 320 may be performed by CSP component 114. The content decryption request includes the encrypted data. The content decryption request is sent over a computer network, such as a LAN, WAN, or the Internet. In cases where the encrypted data is stored remotely, the encrypted data is (a) downloaded first to the client device (e.g., from resource server 120 or another remote server not depicted) and then transmitted to proxy server 130 or (b) downloaded from the remote location to proxy server 130 in response to proxy server 130 receiving the content decryption request. In the latter scenario, the content decryption request includes remote storage data that indicates from where proxy server 130 is to retrieve the encrypted data.

At block 340, in response to receiving the content decryption request, the proxy server initiates one or more security controls. For example, the proxy server may execute one security control and initiate another security control that another component executes. One or more of the security protocols may involve electronic communication with the client device in order to complete a security operation associated with a security control.

At block 350, the proxy server sends the encrypted data to a cryptographic device. The proxy server may also send a key identifier or other data that the cryptographic device uses to decrypt the encrypted data. If the content decryption request includes a reference to the encrypted data, then block 350 may first involve retrieving the encrypted data, which may be stored at the client device (in which cases a request is transmitted to the client device) or remotely at another location, which may be in an external network.

Block 350 may be performed only after the one or more initiated security controls complete successfully. Thus, the proxy server waits for the one or more security controls to complete successfully before block 350 is performed. Alternatively, block 350 is performed prior to the proxy server receiving any indication that the one or more security controls have completed. Thus, in this scenario, the proxy server checks for successful completion of the one or more security controls prior to performing block 370.

At block 360, the proxy server receives the decrypted data from the cryptographic device.

At block 370, the proxy server sends the decrypted data to the client device, after which the client device (or the application executing thereon that triggered process 300) is able reads the decrypted data.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
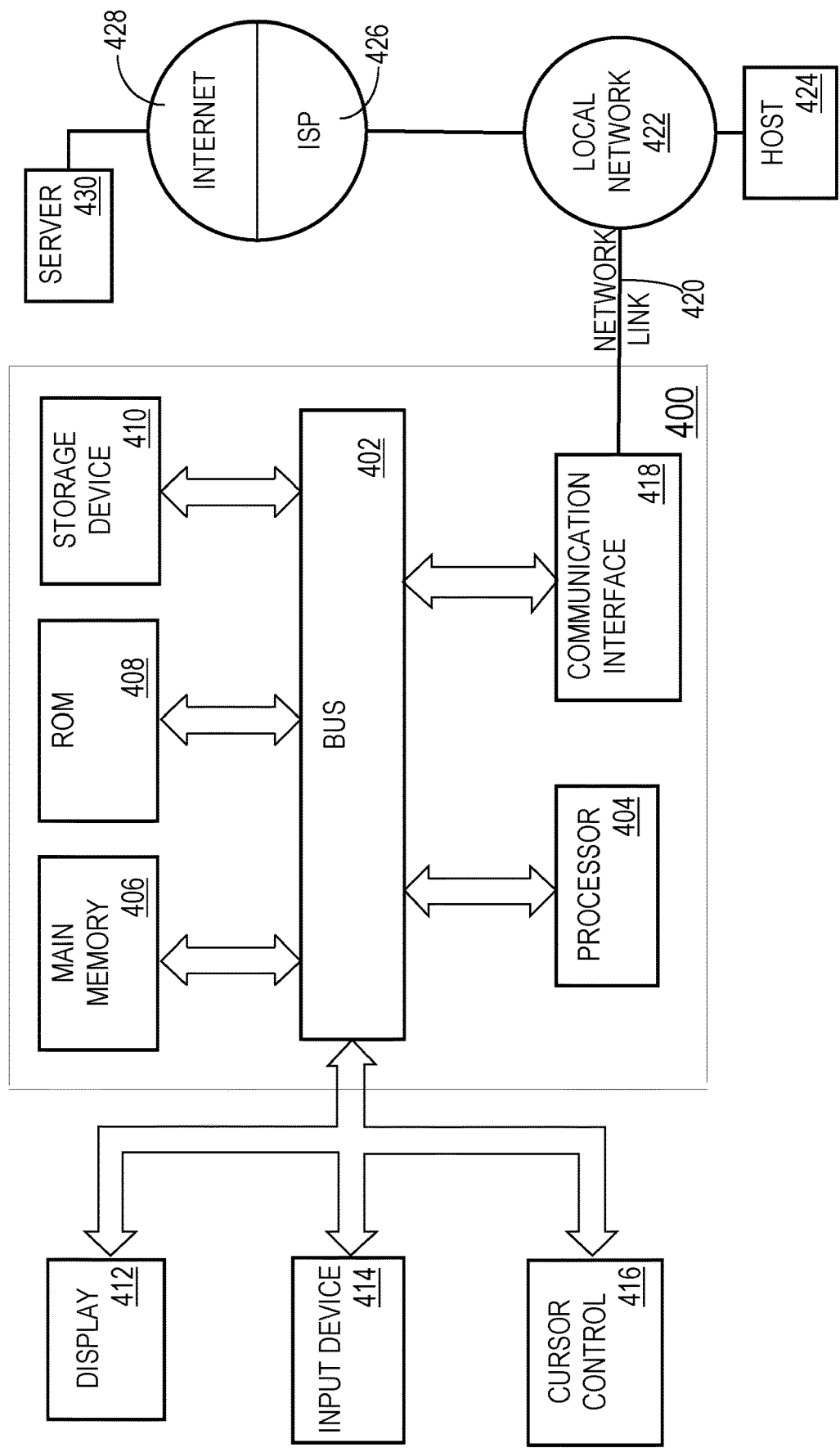
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for transparently adding one or more security controls to a challenge-response-based protocol, the method comprising:
   sending, by a client device, a request for a resource to a resource server;
   receiving, by the client device, a challenge as part of a challenge-response handshake;
   in response to receiving the challenge, forwarding, by the client device, to a proxy server, the challenge as part of a cryptographic request that includes a key identifier and certain data;
   in response to receiving the cryptographic request:
      initiating, by the proxy server, the one or more security controls;
      sending, by the proxy server, the key identifier and the certain data to a cryptographic device that generates output based on the certain data;
   receiving, by the proxy server, the output from the cryptographic device;
   determining, by the proxy server, whether at least one of the one or more security controls resulted in a success;
   sending, by the proxy server, the output to the client device only in response to determining that the at least one of the one or more security controls resulted in a success.

2. The method of claim 1, wherein the certain data is received by the client device from the resource server as part of the challenge.

3. The method of claim 1, wherein:
   the cryptographic request also includes a type indicator that includes a type of cryptographic operation;
   the proxy server sends the key identifier and the certain data to the cryptographic device based on the type indicator.

4. The method of claim 1, wherein the one or more security controls are a plurality of security controls, wherein sending the output to the client device only in response to determining that all the security controls in the plurality of security controls successfully completed.

5. The method of claim 1, wherein the one or more security controls are a plurality of security controls, further comprising:
   determining that a particular security control of the plurality of security controls resulted in a failure;
   wherein sending the output to the client device comprises sending the output to the client device even though the particular security control resulted in the failure.

6. The method of claim 1, further comprising:
   sending, by a second client device, a second request to the resource server;
   receiving, by the second client device, a second challenge as part of a second challenge-response handshake;
   in response to receiving the second challenge, forwarding, by the second client device, to the proxy server, the second challenge as part of a second cryptographic request that includes a second key identifier, a second type indicator that includes a second type of cryptographic operation, and second certain data;
   in response to receiving the second cryptographic request:
      initiating, by the proxy server, one or more security controls with respect to the second cryptographic request;
      determining whether the one or more security controls resulted in a success;
      in response to determining that each of the one or more security controls resulted in a success, based on the second type indicator, sending, by the proxy server, the second key identifier and the second certain data to the cryptographic device that generates second output based on the second certain data;
   receiving, by the proxy server, the second output from the cryptographic device;
   sending, by the proxy server, the second output to the second client device.

7. The method of claim 1, further comprising:
   sending, by a second client device, a second request to the resource server;
   receiving, by the second client device, a second challenge as part of a second challenge-response handshake;
   in response to receiving the second challenge, forwarding, by the second client device, to the proxy server, the second challenge as part of a second cryptographic request that includes a second key identifier, a second type indicator that includes a second type of cryptographic operation, and second certain data;
   in response to receiving the second cryptographic request:
      initiating, by the proxy server, one or more security controls with respect to the second cryptographic request;
      determining whether the one or more security controls resulted in a success;
      in response to determining that at least one of the one or more security controls resulted in a failure, determining not to send the second certain data to the cryptographic device.

8. The method of claim 1, wherein sending the certain data to the cryptographic device is performed prior to receiving a result from any of the one or more security controls.

9. The method of claim 1, wherein:
   the one or more security controls includes multi-factor authentication;
   initiating the one or more security controls comprises initiating, by the proxy server, the multi-factor authentication to authenticate a user of the client device;
   sending the output to the client device is performed only in response to authenticating the user based on the multi-factor authentication.

10. The method of claim 1, wherein:
the one or more security controls includes device authentication;
initiating the one or more security controls comprises initiating, by the proxy server, device authentication to authenticate the client device;
sending the output to the client device is performed only in response to authenticating the client device based on the device authentication.

11. The method of claim 1, wherein:
the one or more security controls includes an approval workflow;
initiating the one or more security controls comprises initiating, by the proxy server, one or more approval requests as part of the approval workflow;
receiving one or more approval responses in response to the one or more approval requests;
sending the output to the client device is performed only in response to receiving the one or more approval responses.

12. The method of claim 1, wherein:
the one or more security controls includes IP address whitelisting;
initiating the one or more security controls comprises:
identifying an IP address of the client device; and
determining, by the proxy server, whether the IP address is listed in a whitelist of one or more IP addresses;
sending the output to the client device is performed only in response to determining that the IP address is listed in the whitelist.

13. The method of claim 1, wherein:
the one or more security controls includes geo-location verification;
initiating the one or more security controls comprises:
determining a geographic location of the client device;
determining whether the geographic location is within an approved geographic region or is outside one or more disapproved geographic regions;
sending the output to the client device is performed only in response to determining that the geographic location is within an approved geographic region or is outside the one or more disapproved geographic regions.

14. The method of claim 1, wherein:
the one or more security controls includes checking a key-specific policy;
initiating the one or more security controls comprises:
identifying, by the proxy server, based on data within the cryptographic request, a particular key-specific policy; and
determining, by the proxy server, based on the particular key-specific policy, whether a cryptographic key associated with the client device is authorized;
sending the output to the client device is performed only in response to determining that the cryptographic key associated with the client device is authorized.

15. The method of claim 1, wherein:
the one or more security controls includes invoking a machine-learned model to authorize use of the cryptographic device or of a key stored in the cryptographic device;
initiating the one or more security controls comprises:
causing, by the proxy server, the machine-learned model to be invoked based on data associated with the cryptographic request, wherein the machine-learned model outputs a score based on the data; and
determining, based on the score, whether the use is authorized;
sending the output to the client device is performed only in response to determining that the use is authorized.

16. The method of claim 1, wherein the resource is one of data, an application, or a service.

17. A computer-implemented method for transparently adding security controls on a remote cryptographic key, comprising:
receiving, from a client device, at a proxy server, a cryptographic request that includes a key name and certain data;
in response to receiving the cryptographic request:
initiating, by the proxy server, one or more security controls;
sending, by the proxy server, the key name and the certain data to a cryptographic device that generates output based on the certain data and that is separate from the one or more security controls;
receiving, by the proxy server, the output from the cryptographic device;
determining, by the proxy server, whether at least one of the one or more security controls resulted in a success;
sending, by the proxy server, the output to the client device only in response to determining that at least one of the one or more security controls resulted in a success.

18. The method of claim 17, wherein the cryptographic request is a decryption request and the certain data is encrypted data, wherein the cryptographic device decrypts the encrypted data based on a key that the cryptographic device stores and that is identified based on the key name, wherein the output is a decrypted version of the encrypted data.

19. The method of claim 17, wherein the cryptographic request is a decryption request and the certain data is challenge data that is associated with a challenge-response handshake between the client device and a resource server, wherein the client device sends the output to the resource server.

20. One or more storage media storing instructions for transparently adding one or more security controls to a challenge-response-based protocol, wherein the instructions, when executed by one or more processors, cause:
receiving, from a client device, a cryptographic request that includes a key identifier and certain data, wherein the client device sends the cryptographic request in response to a challenge that is part of a challenge-response handshake between the client device and a resource server;
in response to receiving the cryptographic request:
initiating, by a proxy server, the one or more security controls;
sending, by the proxy server, the key identifier and the certain data to a cryptographic device that generates output based on the certain data;
receiving, by the proxy server, the output from the cryptographic device;
determining, by the proxy server, whether at least one of the one or more security controls resulted in a success;
sending, by the proxy server, the output to the client device only in response to determining that the at least one of the one or more security controls resulted in a success.

* * * * *